(12) United States Patent
Escott et al.

(10) Patent No.: US 10,753,957 B2
(45) Date of Patent: *Aug. 25, 2020

(54) WIRELESS SMART DEVICES HAVING INTEGRATED FORCE, POSITION, ACCELERATION, AND ROTATIONAL SENSING FOR SCIENCE EDUCATION

(71) Applicant: PASCO scientific, Roseville, CA (US)

(72) Inventors: Richard A. Escott, Rocklin, CA (US); Thomas Reineking, Newcastle, CA (US); Phillip Gulley, Auburn, CA (US); Scott E. Wild, Granite Bay, CA (US); Jon D. Hanks, Newcastle, CA (US); Ann D. Hanks, Newcastle, CA (US)

(73) Assignee: PASCO SCIENTIFIC, Roseville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/688,437

(22) Filed: Nov. 19, 2019

(65) Prior Publication Data

US 2020/0096532 A1    Mar. 26, 2020

Related U.S. Application Data

(63) Continuation of application No. 14/988,690, filed on Jan. 5, 2016, now Pat. No. 10,481,173.

(51) Int. Cl.
*G01P 13/04* (2006.01)
*G01C 21/16* (2006.01)
(Continued)

(52) U.S. Cl.
CPC .............. *G01P 13/04* (2013.01); *G01C 21/16* (2013.01); *G09B 19/0069* (2013.01); *G09B 23/10* (2013.01)

(58) Field of Classification Search
CPC ...... G01P 13/04; G01C 21/16; G09B 19/0069
(Continued)

(56) References Cited

U.S. PATENT DOCUMENTS 4,817,000 A    3/1989  Eberhardt
8,050,863 B2   11/2011 Trepagnier
(Continued)

OTHER PUBLICATIONS

Non-final office action in U.S. Appl. No. 14/988,690 dated Sep. 27, 2018.

(Continued)

*Primary Examiner* — Tarun Sinha
(74) *Attorney, Agent, or Firm* — Womble Bond Dickinson (US) LLP

(57) ABSTRACT

Described herein are wireless smart devices having integrated force, position, acceleration, and rotational sensing for science education (e.g., Newton's laws of motion, kinematics, etc.). An integrated wireless device includes an accelerometer to generate acceleration data based on detecting a current rate of acceleration of the integrated wireless device, a shaft encoder to detect angular positional changes of a shaft or axle of the integrated wireless device over time, and at least one processing unit coupled to the accelerometer. The at least one processing unit is configured to decode angular position data of the shaft encoder into positional data and to synchronize acceleration data received from the accelerometer with the positional data. In one example, a force load cell is coupled to the at least one processing unit. The force load cell measures applied force or impact force.

23 Claims, 7 Drawing Sheets

(51) Int. Cl.
*G09B 19/00* (2006.01)
*G09B 23/10* (2006.01)

(58) Field of Classification Search
USPC .................................................... 73/504.08
See application file for complete search history.

(56) References Cited

U.S. PATENT DOCUMENTS

| | | | |
|---|---|---|---|
| 8,651,206 B2 | 2/2014 | Slawinski | |
| 9,283,681 B2 | 3/2016 | Slawinski | |
| 2007/0219720 A1 | 9/2007 | Trepagnier | |
| 2010/0274441 A1* | 10/2010 | Carresjo | B60C 23/0416 701/31.4 |
| 2013/0087399 A1 | 4/2013 | Slawinski | |
| 2014/0277827 A1* | 9/2014 | Chinnadurai | G07C 5/008 701/1 |
| 2015/0192435 A1 | 7/2015 | Kurpan | |
| 2015/0343644 A1* | 12/2015 | Slawinski | B62D 55/10 701/2 |

OTHER PUBLICATIONS

Non-final office action in U.S. Appl. No. 15/472,100 dated May 1, 2019.

Vernier. (Sep. 4, 2014). New fan cart for physics. Vernier Software and Technology. Retrieved from http://www.vernier.com/news/2014/09/04/new-fan-cart-for-physics/.

Mats Selen, "If you don't know where you're going, you might wind up someplace else," University of Illinois, Jul. 29, 2014, power point presentation, accessed at http://www.iolab.science/documents/AAPT_S14_Selen.pdf on Feb. 5, 2020.

Mats Selen, "Interactive online laboratories: Why, how, when, and where," University of Illinois, Jan. 7, 2014, power point presentation, accessed at http://iolab.science/documents/AAPT_W14.pdf on Feb. 5, 2020.

Mats Selen, "Pedagogy meets technology: Optimizing labs in large enrollment intro courses," University of Illinois, Apr. 2013, power point presentation, accessed at http://www.iolab.science/documents/APS_2013_web.pdf on Feb. 5, 2020.

* cited by examiner excellent# WIRELESS SMART DEVICES HAVING INTEGRATED FORCE, POSITION, ACCELERATION, AND ROTATIONAL SENSING FOR SCIENCE EDUCATION

CROSS-REFERENCE TO RELATED APPLICATIONS

This application is a continuation of U.S. patent application Ser. No. 14/988,690, filed on Jan. 5, 2016, issued as U.S. Pat. No. 10,481,173 on Nov. 19, 2019, the disclosure of which is incorporated herein by reference in its entirety.

TECHNICAL FIELD

Embodiments of the present invention relate to wireless smart devices having integrated force, position, acceleration, and rotational sensing for science education.

BACKGROUND

Science educators present learning material such as science experiments or laboratories with wheeled carts to teach students the principals of Newton's $2^{nd}$ and $3^{rd}$ laws of motion. These experiments use either external position and force sensors or a combination of an internal position sensor and an external force sensor to measure Cart dynamics in lab experiments. Cart acceleration is inferred by calculating the second derivative of position which causes loss of accuracy. The use of a grooved track is required to ensure physical alignment of the cart with an external force sensor. No practical means exists to measure a slope of the cart in movement.

SUMMARY

Described herein are wireless smart devices having integrated force, position, acceleration, and rotational sensing for science education (e.g., Newton's laws of motion, kinematics, etc.). An integrated wireless device includes an accelerometer to generate acceleration data based on detecting a current rate of acceleration of the integrated wireless device, a shaft encoder to detect angular positional changes of a shaft or axle of the integrated wireless device over time, and at least one processing unit coupled to the accelerometer. The at least one processing unit is configured to decode angular position data of the shaft encoder into positional data and to synchronize acceleration data received from the accelerometer with the positional data. In one example, a force load cell is coupled to the at least one processing unit. The force load cell measures applied force or impact force.

BRIEF DESCRIPTION OF THE DRAWINGS

The present invention is illustrated by way of example, and not by way of limitation, in the figures of the accompanying drawings and in which.

DETAILED DESCRIPTION

Figure 1:
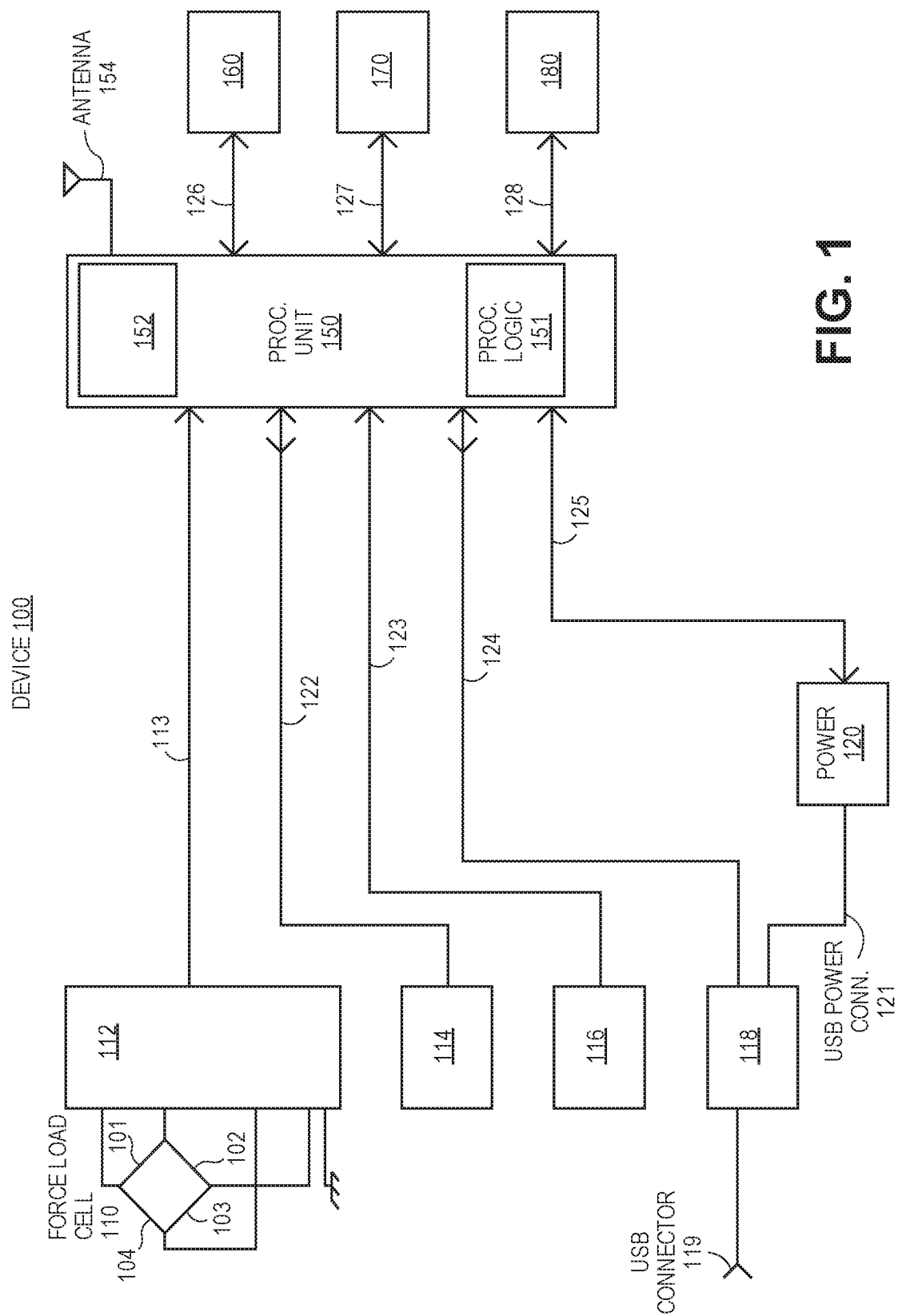
FIG. 1 illustrates a block diagram of a wireless device having integrated force, position, acceleration, and rotational sensing according to one embodiment.

Described herein are wireless smart devices having integrated force, position, acceleration, and rotational sensing for science education (e.g., Newton's laws of motion, kinematics, etc.). All sensors (e.g., position, force, acceleration) are physically integrated into a wireless smart device (e.g., cart, levitating device, etc.) and wireless communication, battery powered device, and no wires are used during a science experiment for demonstrating Newton's laws of motion. Also, no external interface is needed for communications between the integrated wireless device and a computer or another wireless device (e.g., mobile device, tablet device, etc.) that is operating data capture, analysis, and display software for the science experiment. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Embodiments of present design enable students to easily and accurately measure the dynamic properties of devices (e.g., bodies, carts) in motion (e.g., linear motion) including position, velocity, acceleration, slope angle, and applied or impact force.

Wheeled Carts are commonly used in Physics lab experiments to teach students the principles of Newton's $2^{nd}$ and $3^{rd}$ laws of motion. Prior to embodiments of this invention it has been necessary to either use external position and force sensors or a combination of an internal position sensor and an external force sensor to measure Cart dynamics in lab experiments. Cart acceleration was inferred by calculating the second derivative of position, causing loss of accuracy. The use of a grooved track was required to ensure physical alignment of the cart with an external force sensor. No practical means existed to measure slope of the cart in movement. Optional Cart accessories, including fan propulsion, impulse plunger trigger and ball drop apparatus require manual control which compromise experimental data accuracy.

The present design solves the problem of simultaneously measuring motion, force, linear acceleration and slope with high accuracy and time synchronization from within a dynamics Cart. Data is transmitted using wireless RF (e.g., Bluetooth) communication to an external computer for data collection, analysis and display. Wireless communication eliminates the adverse effect of wired connection to a moving cart. Acceleration is directly measured inside the Cart rather than inferred through calculation of the second derivative of position, which yields higher accuracy. Slope is directly measured within the Cart using a gyroscope. Cost is greatly reduced through elimination of multiple internal and external sensors and interface electronics.

The integrated wireless device (e.g., Smart Cart having weight of 200-300 grams) in one example incorporates four wheels on solid axles with low-friction ball bearings to minimize rolling resistance. In one example, a shaft encoder on the rear axle and a quadrature decoder in the body (or at least one processing unit) are used together to precisely measure forward and backward Cart position over time. Linear acceleration is measured directly using an integrated three-axis (x,y,z) MEMs accelerometer. Cart slope is measured using an integrated MEMs gyroscope physically aligned with the accelerometer. An integrated load cell is used to measure externally applied or impact forces. All sensor measurements are time synchronized by a central microprocessor and then transmitted over a Bluetooth wireless link to an external computer for recording, analysis and display. At least one processing unit or a central microprocessor communicate through an electrical connector to control optional accessories.

In one embodiment, the Smart Cart contains a force load cell, a 6-axis accelerometer/gyroscope, optical shaft encoder with built-in decoder, microprocessor for the Bluetooth Smart radio and control, rechargeable Lithium Polymer battery with built-in charger, USB connection for battery charging and firmware upgrades, a manually or electronically activated spring loaded plunger for impulse action, and an electrical connector for accessory attachments.

FIG. 1 illustrates a block diagram of a wireless device having integrated force, position, acceleration, and rotational sensing according to one embodiment. This device 100 may include a processing unit 150 (e.g., microprocessor) having a RF communication module 152 (e.g., Bluetooth, WiFi, Zigbee, etc.) with antenna 154 and also a processing unit 118 (e.g., USB microprocessor). The device includes a force load cell 110 (e.g., strain gauge, hydraulic, pneumatic, etc.) that creates an electrical signal having a magnitude that is directly proportional to a force (e.g., +/−100 Newtons) being measured. In one example, the force load cell 110 is a strain gauge load cell having strain gauges 101-104 which are configured in a Wheatstone bridge configuration (e.g., 1 K ohm). The electrical signal output by the force load cell 110 is typically small (e.g., a few millivolts (mV), 2.3 mV/V with +/−0.23 mV/V) and is amplified by an amplifier of amplifier unit 112 to generate an amplified signal (e.g., 0.737 V with +/−0.735 V nominal). This unit 112 may also include a level shifter and a filter. This unit 112 generates an output signal that is sent to the processing unit 150 via a connection 113 (e.g., communication link, bus, signal line, electrical connection, etc.).

A motion unit 114 detects acceleration and rotational data. In one example, the motion unit 114 includes a 3-axis MEMs accelerometer for determining acceleration data in 3 dimensions and also a 3-axis MEMs gyroscope for determining rotational data in 3 dimensions that can be used for determining a slope of movement of the wireless device 100. The gyroscope can be physically aligned with the accelerometer. The motion unit 114 communicates with the processing unit 150 via the bi-directional connection 122 (e.g., communication link, bus, signal line, electrical connection, etc.). For example, acceleration and rotation data can be sent to the processing unit 150.

A shaft encoder 116, (e.g., a mechanical encoder, an optical shaft encoder, etc.) may be positioned in proximity to an axle or shaft of the wireless device 100. The encoder 116 converts angular position of an axle or shaft that is coupled to a wheel into an analog or digital code. The processing unit 150 or a built-in decoder (e.g., quadrature decoder located in a body of the wireless device) then determines positional data of the wireless device 100. The encoder 116 communicates with the processing unit 150 via the bi-directional connection 123 (e.g., communication link, bus, signal line, electrical connection, etc.).

A processing unit 118 (e.g., USB microprocessor) is coupled to a USB connector 119 and a power module 120 (e.g., battery, charger, power supplies) that can provide USB power to the processing unit 118 via power connection 121. The power module 120 is coupled to the processing unit 150 via a bi-directional connection 125 and the processing unit 118 is coupled to the processing unit 125 via a bi-directional connection 124. The power module 120 provides power to the processing unit 150, which may have a different power supply (e.g., 3.3 volts) than the processing unit 118. The power module 120 may include a lithium polymer battery in combination with standard electronics that monitor the battery charge and prevent it from dropping below a critical level. In one example, a USB connection to the processing unit 118 performs an update of firmware of the device 100 in a faster manner than using a wireless connection of the RF communication module 152 for performing the update of firmware.

The processing unit 150 is coupled to a module 160, accessory port(s) 170, and memory 180 via bi-directional connections 126-128. The module 160 includes LEDs and power for illuminating different components (e.g., cart lights) of the device 100. The accessory port(s) 170 can be coupled to different types of accessories (e.g., fan propulsion, impulse plunger trigger, ball drop/projector apparatus). The memory 180 (e.g., flash memory) stores data and software instructions for the processing unit 150.

The memory 180 may include a machine-accessible storage medium having one or more sets of instructions (e.g., software) embodying any one or more of the methodologies or functions described herein. The software may also reside, completely or at least partially, within the memory 180 and/or within the processing unit 150 or 118 during execution thereof by the device 100, the memory 180 and the processing unit 150 also constituting machine-accessible storage media.

While the memory 180 (e.g., machine-accessible storage medium) is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

The processing units 118 and 150 represent one or more general-purpose processing devices such as a processing system, central processing system, or the like. More particularly, the processing units 118 and 150 may be a complex instruction set computing (CISC) processing system, reduced instruction set computing (RISC) processing system, very long instruction word (VLIW) processing system, or a processor implementing other instruction sets or processors implementing a combination of instruction sets. The processing units 118 and 150 may also be one or more special-purpose processing devices such as an application specific integrated circuit (ASIC), a field programmable gate array (FPGA), a digital signal processor (DSP), network processor, or the like. The processing unit 150 may be configured to execute the processing logic 151 for performing the operations and steps discussed herein.

In an alternative embodiment, the device 100 includes a force load cell for detecting force and a motion unit for detecting acceleration and rotational data. The device may not include a shaft encoder though and this device can be attached to any type of apparatus even apparatuses having no axles.

Figure 2:
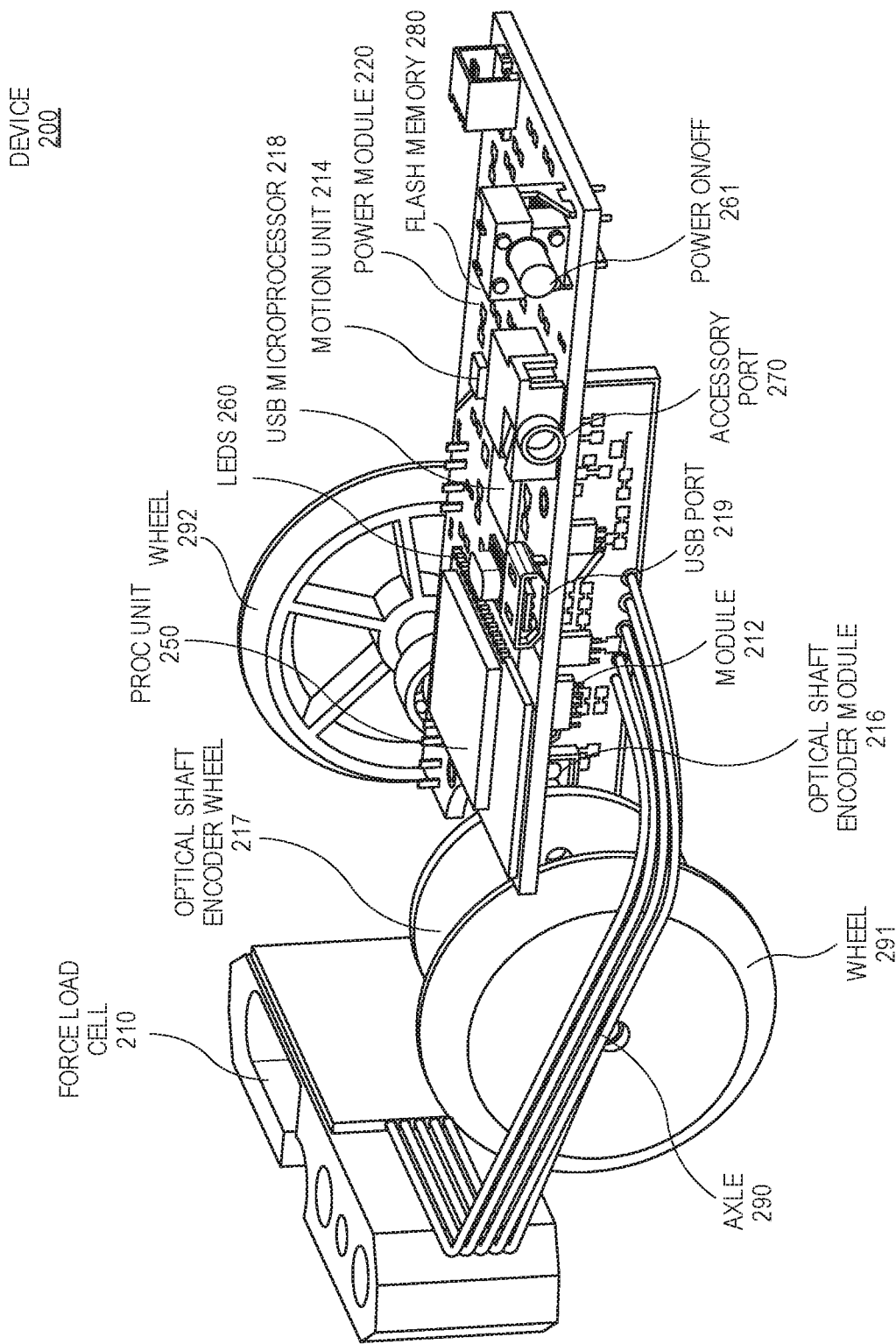
FIG. 2 illustrates components of a wireless device in accordance with one embodiment.

FIG. 2 illustrates components of a wireless device in accordance with one embodiment. The device 200 is illustrated with wheels 291-292 and no body or enclosure for purpose of illustrating internal components of the device. The device 200 includes similar components in comparison to the components described in conjunction with FIG. 1. The device 200 includes a force load cell 210, a shaft encoder module 216 (e.g., shaft encoder 116), a shaft encoder wheel 217 (e.g., optical shaft encoder wheel), a processing unit 250, LEDs 260, a USB microprocessor 218, a motion unit 214 having a 3-axis accelerometer and a 3-axis gyroscope, power supply module 220, flash memory 280, power on/off component 261, accessory port(s) 270, USB port 219, a module 212 having an amplifier, level shifter, and filter, and axle 290 that rotates to turn the wheels 290-291 and 217. The optical shaft encoder 216 uses optical sensor(s) to monitor motion of the wheel 217 to determine a position of the device 200. The device 200 may include additional wheels or fewer wheels having low bearing friction. In another example, the device may levitate above a track or surface and have no wheels.

Figure 3:
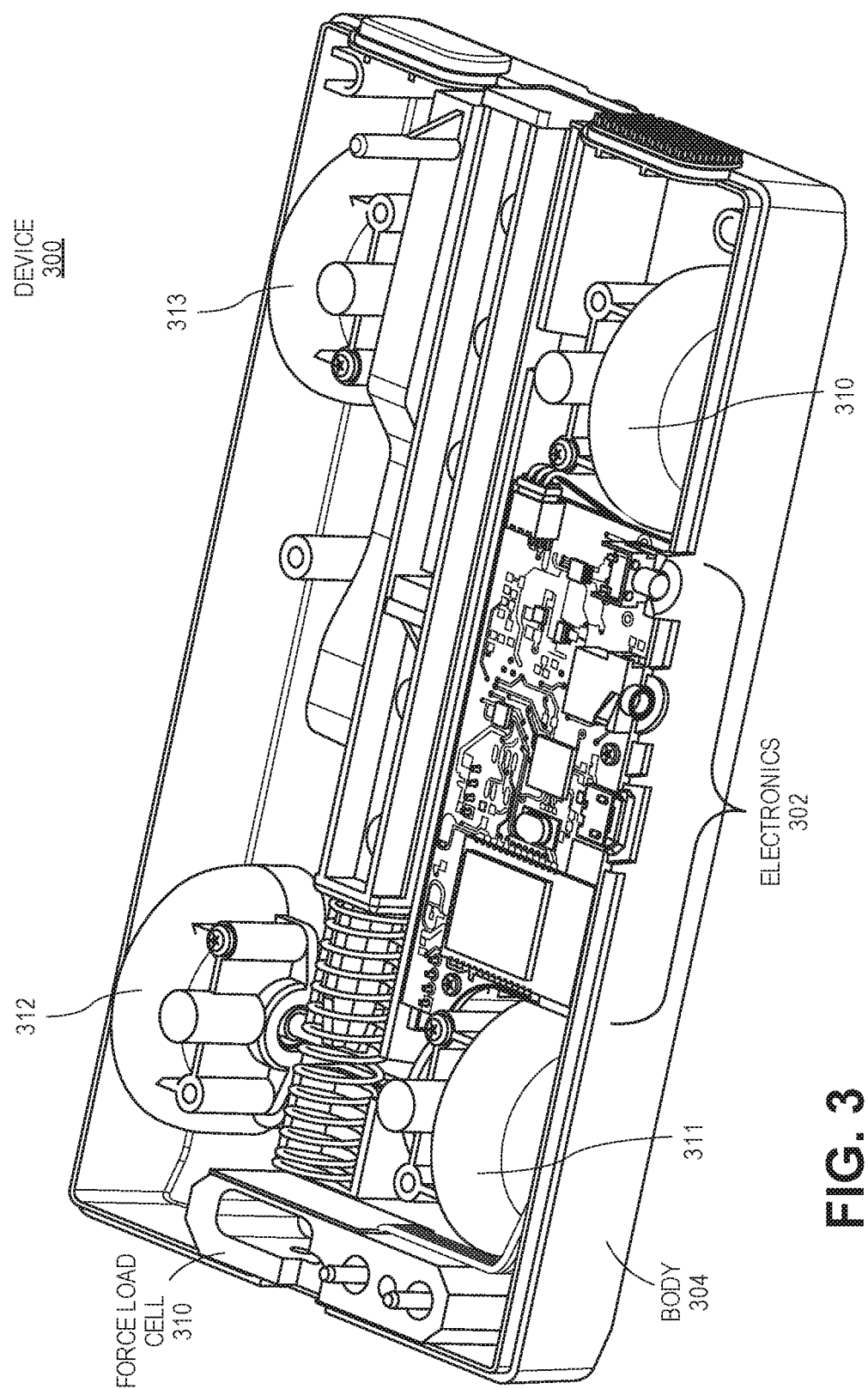
FIG. 3 illustrates a body that contains components of a wireless device in accordance with one embodiment.

FIG. 3 illustrates a body that contains components of a wireless device in accordance with one embodiment. The device 300 is illustrated with wheel housings 310-313 within a body 304. The device 300 includes similar components in comparison to the components described in conjunction with FIGS. 1-2. The device 300 includes a force load cell 310 and an electronics region 302 having different components (e.g., a shaft encoder module, a processing unit, LEDs, a USB microprocessor, a motion unit having a 3-axis accelerometer and a 3-axis gyroscope, power supply module, flash memory, a module 212 having an amplifier, level shifter, and filter). The device 300 may include additional wheels or fewer wheels. In another example, the device may levitate above a track or surface and have no wheels.

Figure 4:
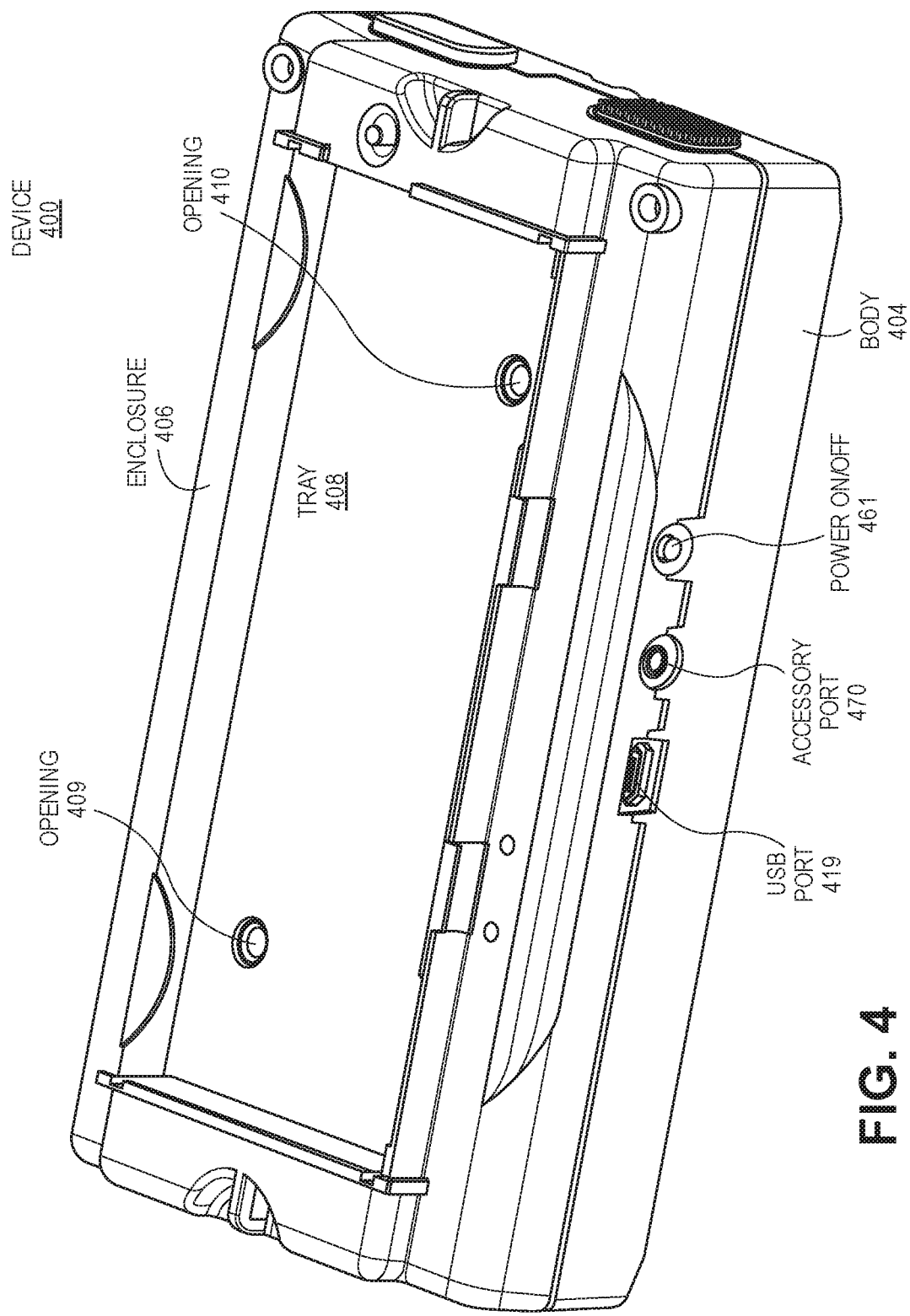
FIG. 4 illustrates an upper view of a body and an enclosure of a wireless device in accordance with one embodiment.

FIG. 4 illustrates an upper view of a body and an enclosure of a wireless device in accordance with one embodiment. The device 400 is illustrated with a body 404 and an enclosure 406 that protects the components of the wireless device (e.g., device 100, device 200, device 300). The device 400 includes similar components in comparison to the components described in conjunction with FIGS. 1-3. The device 400 includes a USB port 419, accessory port(s) 470, and power ON/OFF 461. An upper region of the enclosure 406 includes a tray 408 having openings 409 and 410. The tray can be used for supporting and positioning one or more accessories. The tray can also be used for supporting additional masses if desired for increasing a mass of the wireless device.

Figure 5:
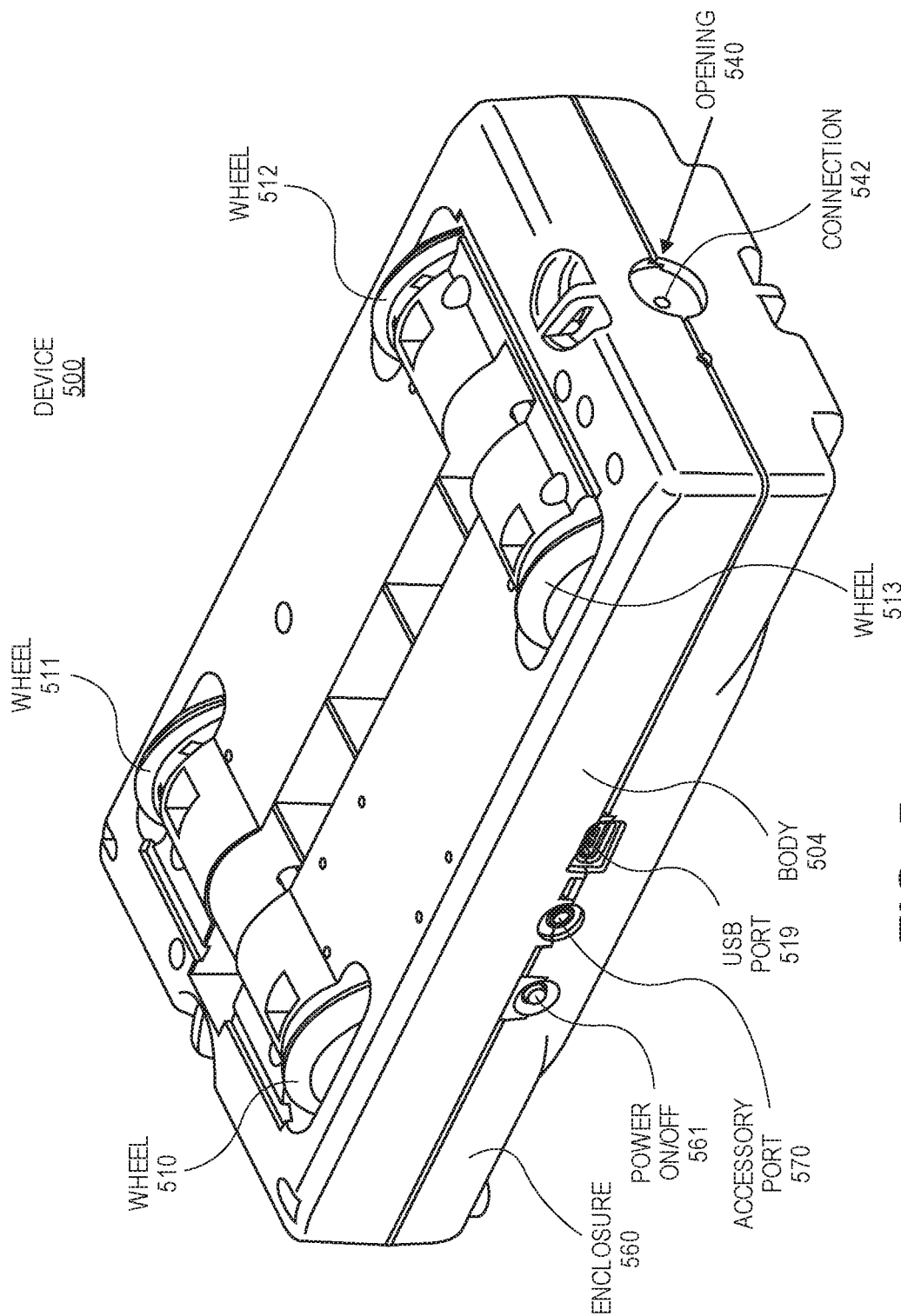
FIG. 5 illustrates a lower view of a body and an enclosure of a wireless device in accordance with one embodiment.

FIG. 5 illustrates a lower view of a body and an enclosure of a wireless device in accordance with one embodiment. The device 500 is illustrated with a body 504 and an enclosure 560 that protects the components of the wireless device (e.g., device 100, device 200, device 300). The device 500 includes similar components in comparison to the components described in conjunction with FIGS. 1-4. The device 500 includes a USB port 519, accessory port(s) 570, power ON/OFF 561. A lower region of the body 504 includes openings for wheels 510-513 of the device 500.

The enclosure and body include an opening 540 for accessing a connection 542 to a force load cell. Accessories or components (e.g., hook, bumper, spring, magnets, etc.) can then be connected to the force load cell using the connection 542. In one example, the connection 542 includes a screw hole for connecting to the force load cell.

Figure 6:
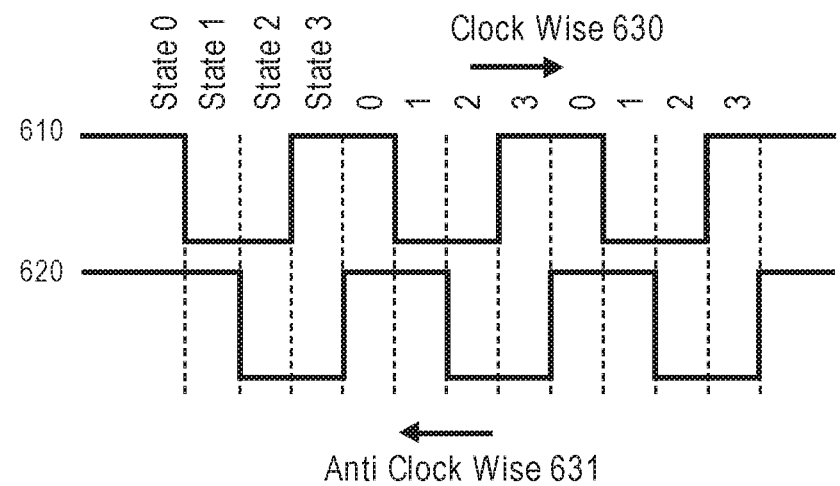
FIG. 6 illustrates a timing diagram for decoding of inputs providing by an encoder in accordance with one embodiment.

FIG. 6 illustrates a timing diagram for decoding of inputs providing by an encoder in accordance with one embodiment. An encoder (e.g., encoder 116, 216) provides signals 610 and 620 that are generated based on when the encoder is rotating. The signals 610 and 620 are quadrature outputs of the encoder due to being 90 degrees out of phase. In one example, optical sensors monitor motion of the wireless device (e.g., a wheel 217). A processing unit or decoder assigns states 0-3 to different regions of the signals 610 and 620. In one example, each state change increments a counter (clock wise 630) or decrements a counter (counter clock wise 631) as illustrated in FIG. 6. In one example, each count equals approximately a 0.07 mm position change of a cart.

Figure 7:
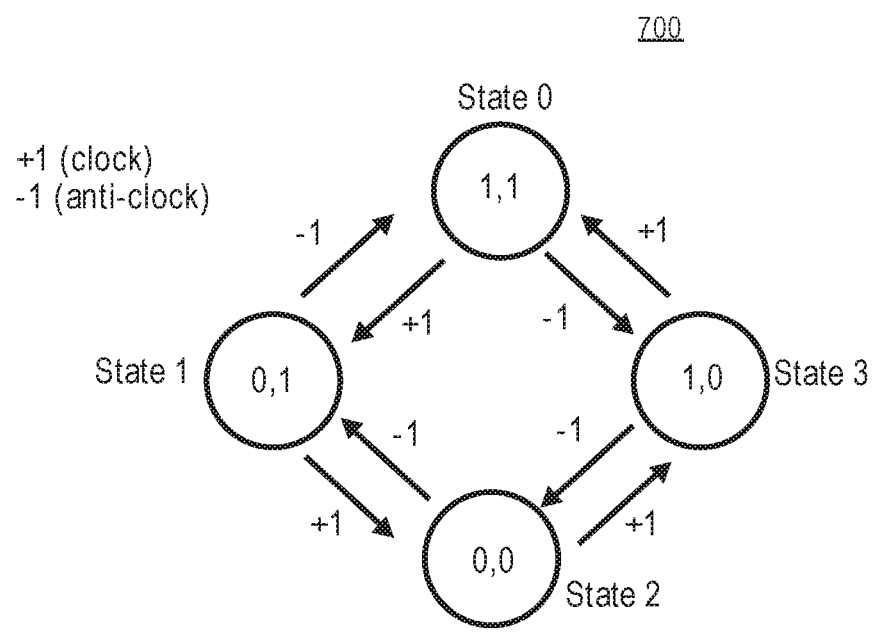
FIG. 7 illustrates an incremental rotary encoder state machine in accordance with one embodiment.

FIG. 7 illustrates an incremental rotary encoder state machine in accordance with one embodiment. A state machine 700 includes states 0-3. The signals 610 and 620 are decoded to generate a count up pulse or a count down pulse. A state change of +1 indicates motion in a clockwise direction and a state change of −1 indicates motion in a counter clockwise direction. The incremental rotary encoder state machine allows accurate determination of wireless device position independent of an external surface or track.

Figure 8:
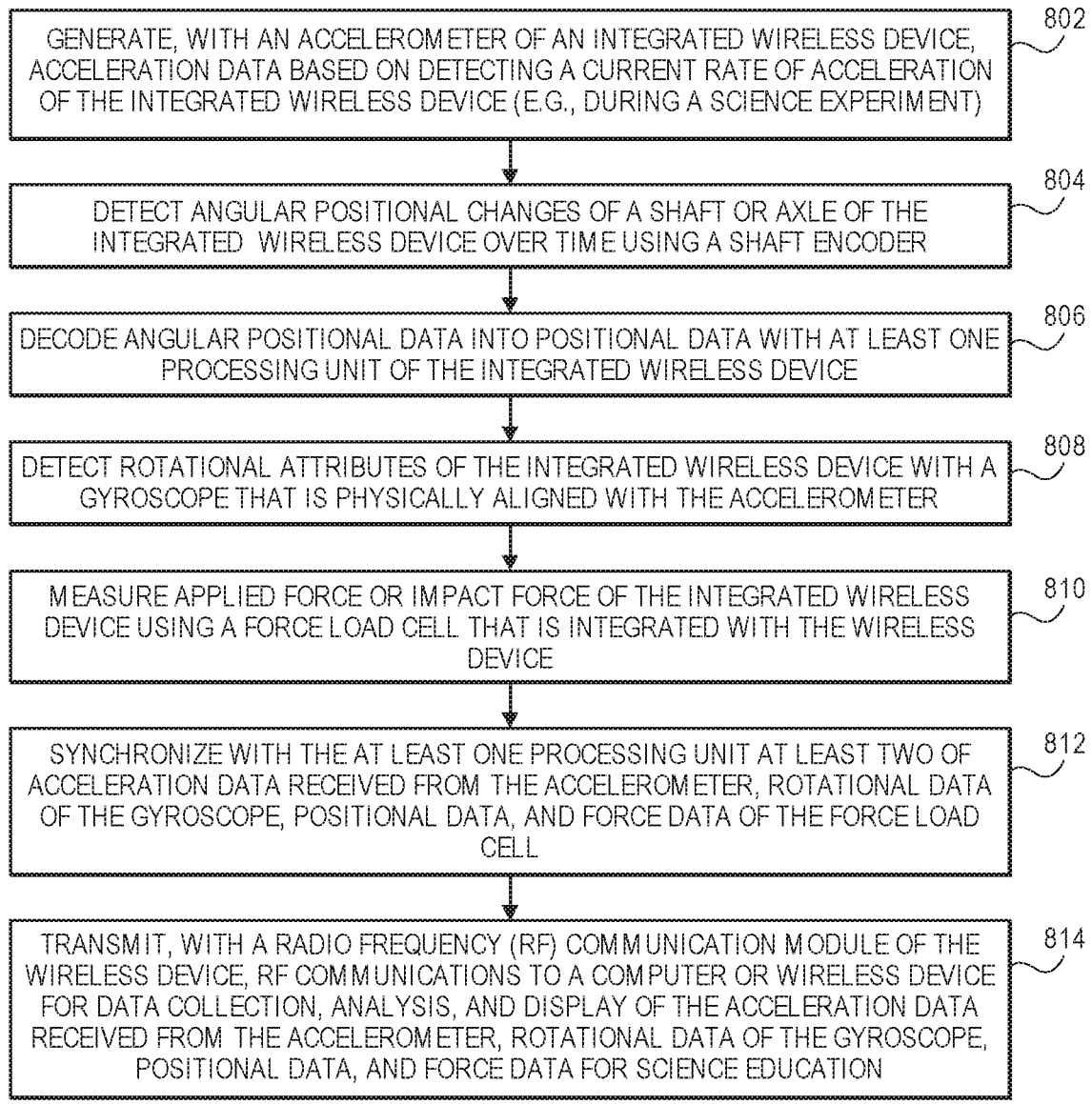
FIG. 8 illustrates a flow diagram of one embodiment for a method 800 of performing dynamics experiments.

FIG. 8 illustrates a flow diagram of one embodiment for a method 800 of performing dynamics experiments. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of at least one wireless device (e.g., cart, vehicle, levitating device, drone, self-guided device, self-propelled device, etc). The wireless device executes instructions of a software application or program with processing logic. In one example, the integrated wireless device performs some or all of the operations of the method 800.

At operation 802, the method includes generating, with an accelerometer of an integrated wireless device, acceleration data based on detecting a current rate of acceleration of the integrated wireless device (e.g., during a science experiment). At operation 804, the method includes detecting angular positional changes of a shaft or axle of the integrated wireless device over time using a shaft encoder. At operation 806, the method includes decoding angular positional data into positional data with at least one processing unit of the integrated wireless device. In one example, the shaft encoder is positioned in proximity to the shaft or axle of the integrated wireless device.

At operation 808, the method further includes detecting rotational attributes of the integrated wireless device with a gyroscope that is physically aligned with the accelerometer. At operation 810, the method further includes measuring applied force or impact force of the integrated wireless device using a force load cell that is integrated with the wireless device. At operation 812, the method further includes synchronizing with the at least one processing unit at least two of acceleration data received from the accelerometer, rotational data of the gyroscope, positional data, and force data of the force load cell. At operation 814, the method further includes transmitting, with a radio frequency (RF) communication module of the wireless device, RF communications to a computer or wireless device for data collection, analysis, and display of the acceleration data received from the accelerometer, rotational data of the gyroscope, positional data, and force data for science education.

In one embodiment, the processing logic (e.g., at least one processing unit) of the integrated wireless device determines direct synchronous measurement of position and acceleration of the wireless device. No track is required for position measurements in contrast to prior approaches with carts. A slope of the wireless device is measured electronically with a gyroscope. Applied or impact force can be measured for a single device (e.g., cart) or for multiple colliding devices (e.g., carts).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system for collecting data that measures dynamic properties of an integrated wireless device during a science experiment comprising:
   a three-axis accelerometer to generate acceleration data in three dimensions based on detecting a current rate of acceleration of the integrated wireless device over a period of time;
   an optical encoder to generate encoder signals in response to angular positional changes of an encoder wheel caused by movement of the integrated wireless device over the period of time;
   at least one processing device communicatively coupled with the three-axis accelerometer and the optical encoder, the at least one processing device is configured to process the encoder signals generated by the optical encoder into positional data over the period of time and to time synchronize the acceleration data received from the accelerometer to the positional data processed by the at least one processing device to generate time synchronized dynamic properties of the integrated wireless device during the science experiment over the period of time.

2. The system of claim 1, further comprising:
   an accessory port, communicatively coupled to the at least one processing device, wherein the accessory port is configured to couple with one of a plurality of different types of external accessories for use with the integrated wireless device during the science experiment.

3. The system of claim 1, further comprising:
   a universal serial bus (USB) connector communicably coupled with the at least one processing device; and
   a power module communicably coupled with the at least one processing device and the USB connector, the power module comprising a rechargeable battery and a charger, wherein the charger recharges the rechargeable battery when a power source is coupled to the USB connector.

4. The system of claim 1, further comprising:
   a force sensor coupled to the at least one processing device, the force sensor to generate force data indicative of applied forces or impact forces experienced by the integrated wireless device over the period of time; and
   the at least one processing device is further configured to time synchronize acceleration data generated by the three-axis accelerometer, positional data, and force data generated by the force load cell over the period of time.

5. The system of claim 1, wherein the optical encoder comprises an optical shaft encoder that is positioned in proximity to at least one wheel of the integrated wireless device.

6. The system of claim 1, further comprising:
   a wireless communication device coupled to the at least one processing device, the wireless communication device to transmit wireless communications to a computer or another wireless device for data collection, analysis, and display of the synchronized acceleration data and positional data for science education.

7. The system of claim 1, wherein the at least one processing device of the integrated wireless device receives acceleration data from the accelerometer and encoder signals from the optical encoder without any external sensors and without any wired connections to external components.

8. The system of claim 1, wherein the at least one processing device configured to process the encoder signals generated by the optical encoder into positional data over the period of time comprises the processor configured to decode encoded signals generated by an encoder of the optical encoder device into the positional data over the period of time.

9. The system of claim 1, further comprising:
   a gyroscope that is physically aligned with the three-axis accelerometer, the gyroscope to generate rotational data of the integrated wireless device indicative of pitch, roll, and yaw of the integrated wireless device over the period of time; and
   the at least one processing device is further configured to time synchronize acceleration data generated by the three-axis accelerometer, rotational data generated by the gyroscope, and positional data over the period of time.

10. An integrated wireless cart for collecting data that measures dynamic properties of the integrated wireless cart during a science experiment comprising:
    a plurality of wheels enabling movement of the integrated wireless cart over a period of time;
    a body comprising a plurality of housings for the plurality of wheels, and wherein the body is configured to contain one or more components of the integrated wireless cart, the one or more components comprising:
       a motion device to generate motion data based on detecting a current rate of motion of the integrated wireless cart over the period of time as the cart rolls on the plurality of wheels;
       an optical encoder device to generate encoder signals in response to angular positional changes of an encoder wheel caused by the movement of the integrated wireless cart over the period of time, and
       at least one processing device communicatively coupled to the motion device and the optical encoder device, the at least one processing device is configured to process the encoder signals generated by the optical encoder device into positional data over the period of time and to time synchronize the acceleration data received from the motion device to the positional data processed by the at least one processing device to generate time synchronized dynamic properties of the integrated wireless device during the science experiment over the period of time.

11. The integrated wireless cart of claim 10, wherein the at least one processing device configured to process the encoder signals generated by the optical encoder into positional data further comprises the at least one processing device configured to decode encoded signals generated by an encoder of the optical encoder device into the positional data over the period of time.

12. The integrated wireless cart of claim 10, wherein the motion device comprises:
a three-axis accelerometer to generate acceleration data in three dimensions based on detecting a current rate of acceleration of the integrated wireless cart over the period of time.

13. The integrated wireless cart of claim 12, further comprising:
a force sensor coupled with the at least one processing device, the force sensor to generate force data indicative of applied forces or impact forces experienced by the integrated wireless cart over the period of time; and
the at least one processing device is further configured to time synchronize acceleration data generated by the three-axis accelerometer, positional data, and force data generated by the force load cell over the period of time.

14. The integrated wireless cart of claim 12, further comprising:
the motion device further comprising a gyroscope that is physically aligned with the three-axis accelerometer, the gyroscope to generate rotational data of the integrated wireless cart indicative of pitch, roll, and yaw of the integrated wireless cart over the period of time; and
the at least one processing device is further configured to time synchronize acceleration data generated by the three-axis accelerometer, rotational data generated by the gyroscope, and positional data over the period of time.

15. The integrated wireless cart of claim 10, wherein the body further comprises:
an accessory port, communicatively coupled to the at least one processing device, wherein the accessory port is configured to couple with one of a plurality of different types of external accessories for use with the integrated wireless cart during the science experiment.

16. The integrated wireless cart of claim 10, wherein the body further comprises a universal serial bus (USB) connector communicably coupled with the at least one processing device, and wherein the body is configured to support a power module communicably coupled with the at least one processing device and the USB connector, the power module comprising a rechargeable battery and a charger, wherein the charger recharges the rechargeable battery when a power source is coupled to the USB connector.

17. The integrated wireless cart of claim 10, wherein the optical encoder device comprises an optical shaft encoder that is positioned in proximity to at least one wheel of the integrated wireless cart.

18. The integrated wireless cart of claim 10, wherein the body of the integrated wireless cart is further configured to contain:
a wireless communication device coupled to the at least one processing device, the wireless communication device to transmit wireless communications to a computer or another wireless device for data collection, analysis, and display of the synchronized motion data and positional data for science education.

19. The system of claim 10, wherein the at least one processing device of the integrated wireless cart receives motion data from the motion device and encoder signals from the optical encoder device without any external sensors and without any wired connections to external components.

20. A method for collecting data that measures dynamic properties of an integrated wireless device during a science experiment, the method comprising:
generating, with a three-axis accelerometer of the integrated wireless device, acceleration data based on detecting a current rate of acceleration of the integrated wireless device over a period of time;
generating signals, with an optical encoder, in response to angular positional changes of an encoder wheel caused by movement of the integrated wireless device over the period of time;
processing, by at least one processing device communicatively coupled with the three-axis accelerometer and the optical encoder, the encoder signals into positional data over the period of time; and
synchronizing, by at least one processing device, acceleration data received from the accelerometer to the positional data decoded by the at least one processing device to generate time synchronized dynamic properties of the integrated wireless device during the science experiment over the period of time.

21. The method of claim 20, further comprising:
detecting, with a force sensor coupled to the at least one processing device, force data indicative of applied forces or impact forces experienced by the integrated wireless device over the period of time; and
synchronizing, with the at least one processing device, the acceleration data generated by the three-axis accelerometer, positional data, and force data generated by the force load cell over the period of time.

22. The method of claim 20, further comprising:
transmitting, with a wireless communications device of the integrated wireless device, wireless communications to a computer or another wireless device for data collection, analysis, and display of the synchronized acceleration data and positional data for science education.

23. The method of claim 20, further comprising:
detecting, with a gyroscope that is physically aligned with the three-axis accelerometer, rotational data of the integrated wireless device indicative of pitch, roll, and yaw of the integrated wireless device over the period of time; and
synchronizing, with the at least one processing device, the acceleration data generated by the three-axis accelerometer, rotational data generated by the gyroscope, and positional data over the period of time.

* * * * *